US011010958B2

(12) United States Patent
Bickerstaff et al.

(10) Patent No.: US 11,010,958 B2
(45) Date of Patent: May 18, 2021

(54) METHOD AND SYSTEM FOR GENERATING AN IMAGE OF A SUBJECT IN A SCENE

(71) Applicant: Sony Interactive Entertainment Inc., Tokyo (JP)

(72) Inventors: Ian Henry Bickerstaff, London (GB); Andrew Damian Hosfield, London (GB); Nicola Orrù, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/818,079

(22) Filed: Mar. 13, 2020

(65) Prior Publication Data
US 2021/0065432 A1 Mar. 4, 2021

(30) Foreign Application Priority Data
Aug. 27, 2019 (GB) .................................... 1912248

(51) Int. Cl.
*G06T 15/20* (2011.01)
*H04N 13/271* (2018.01)
(Continued)

(52) U.S. Cl.
CPC .......... *G06T 15/20* (2013.01); *G02B 27/0172* (2013.01); *G06T 7/75* (2017.01);
(Continued)

(58) Field of Classification Search
CPC .............................. G06T 15/20; G06T 19/006
See application file for complete search history.

(56) References Cited

U.S. PATENT DOCUMENTS

| 2013/0127889 A1* | 5/2013 | Winnemoeller | G06T 11/001 345/582 |
| 2014/0104274 A1* | 4/2014 | Hilliges | G06F 30/20 345/424 |

(Continued)

FOREIGN PATENT DOCUMENTS

| EP | 2979736 A2 | 2/2016 |
| WO | 2019063976 A1 | 4/2019 |

OTHER PUBLICATIONS

Combined Search and Examination Report for corresponding GB Application No. 1912248, 7 pages, dated Feb. 24, 2020.
(Continued)

*Primary Examiner* — Phi Hoang
(74) *Attorney, Agent, or Firm* — Matthew B. Dernier Esq.

(57) ABSTRACT

A method of generating an image of a subject in a scene includes obtaining a first image and a second image of a subject in a scene, each image corresponding to a different respective viewpoint of the subject, each image being captured by a different respective camera, where at least some of the subject is occluded in the first image and not the second image by virtue of the different viewpoints, obtaining camera pose data indicating a pose of a camera for each image, re-projecting, based on the difference in camera poses associated with each image, at least a portion of the second image to correspond to the viewpoint from which the first image was captured, and combining the re-projected portion of the second image with at least some of the first image so as to generate a composite image of the subject from the viewpoint of the first image, the re-projected portion of the second image providing image data for at least some of the occluded part or parts of the subject in the first image.

17 Claims, 13 Drawing Sheets

(51) Int. Cl.
*G06T 7/73* (2017.01)
*G02B 27/01* (2006.01)
*H04N 13/349* (2018.01)
*H04N 13/332* (2018.01)

(52) U.S. Cl.
CPC ......... *H04N 13/271* (2018.05); *H04N 13/332* (2018.05); *H04N 13/349* (2018.05); *G02B 2027/014* (2013.01)

(56) References Cited

U.S. PATENT DOCUMENTS

| 2015/0179218 | A1* | 6/2015 | Nadler | H04N 13/144 |
| | | | | 382/154 |
| 2015/0187136 | A1* | 7/2015 | Grimaud | G06T 17/00 |
| | | | | 345/420 |
| 2016/0003636 | A1* | 1/2016 | Ng-Thow-Hing | G08G 1/167 |
| | | | | 701/26 |
| 2018/0286134 | A1* | 10/2018 | Warhol | H04N 13/366 |
| 2018/0309971 | A1* | 10/2018 | Meyassed | H04N 13/122 |
| 2020/0234398 | A1* | 7/2020 | Holzer | G06T 7/70 |

OTHER PUBLICATIONS

Siavash Zokai et al., "Multiview Paraperspective Projection Model for Diminished Reality", Proceedings—The Second IEEE and ACM International Symposium on Mixed and Augmented Reality: pp. 1-10, Oct. 7-10 2003.

Shohei Mori, et al., "A survey of diminished reality: Techniques for visually concealing, eliminating, and seeing through real objects", IPSJ Transactions on Computer Vision and Applications, vol. 9, No. 1, pp. 1-14, Jun. 28, 2017.

Songkran Jarusirisawad, et al.,"Diminished Reality Via Multiple Hand-Held Cameras", Distributed Smart Cameras, ICDSC '07. First ACM/IEEE International Conference on , IEEE, PI, pp. 251-258, Sep. 1, 2007.

Meerits Siim et al., "Real-Time Diminished Reality for Dynamic Scenes", 2015 IEEE International Symposium on Mixed and Augmented Reality Workshops, IEEE, pp. 53-59, Sep. 29, 2015.

Joseph Louis, et al., "Rendering stereoscopic Augmented Reality Scenes With Occlusions Using Depth From Stereo and Texture" Mapping Construction Research Congress, pp. 1370-1380, Jan. 1, 2020.

Extended European Search Report for corresponding EP Application No. 20156168.5, 12 pages, dated Mar. 24, 2020.

* cited by examiner

METHOD AND SYSTEM FOR GENERATING AN IMAGE OF A SUBJECT IN A SCENE

BACKGROUND OF THE INVENTION

Technical Field

The present disclosure relates to a method and system for generating an image of a subject in a scene. The present disclosure further relates to generating such an image for display at a head-mountable display (HMD).

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In recent times, video content has become increasingly immersive. This has been due, in part, to the proliferation of HMDs, through which viewers are able to view such content. HMDs enable viewers to view content that has been superimposed over their world view, be that partially (in the case of augmented reality) or completely (in the case of virtual reality). In some cases, virtual content may be displayed to a viewer in a manner that respects the physical environment in which they're located (so-called mixed reality).

In some applications, a viewer may be presented with a 3D reconstruction of a real-life event. For example, the real-life event may correspond to a recording of a performer, e.g. playing a piece of music, presenting content, acting in a fictional series, etc. An example of such content is the 'Joshua Bell VR Experience' available on the PS4 (via PSVR).

A known technique for representing a performer in virtual reality (VR) involves arranging multiple cameras around the performer using e.g. a rig. The video captured by the cameras is used to create a complete geometric model of the performer, which can then be displayed appropriately to the viewer based on the viewer's orientation relative to the model. As will be appreciated, capturing VR content in this way is a time-consuming and expensive process. Moreover, the VR content resulting from such a capture process can often appear lifeless, with soft edges (such as hair) and complex surface materials not accurately being represented, if at all.

Light-field rendering is another technique that may be used for representing objects in 3D. However, light-field rendering tends to be computationally expensive and is often limited to representing static objects only.

One technique that alleviates these problems, at least to an extent, involves capturing a stereoscopic video of a performer and projecting this video as a texture onto a mesh with a 3D reconstruction of an environment. An example of such a technique is described in PCT/GB2018/052671. The use of a stereoscopic video projected onto a mesh tends to result in soft edges and complex surfaces of the subject appearing more realistic in the viewed content. However, there is a trade-off between this realism and the degree of movement that a viewer can exhibit before limitations of the technique become apparent. For example, a viewer could not walk behind a subject that had been reconstructed in this manner, unless a stereoscopic video had been captured from that viewpoint.

Typically, when capturing stereoscopic video for projecting onto a mesh, a stereoscopic camera is used to capture a video of the performer. The camera is usually static during the capture process, with movement of the camera relative to the performer being simulated during playback based on a viewer's head movements. During filming, there may be times at which parts of the performer are occluded in the captured stereoscopic video, due to e.g. objects, such as instruments, being positioned in front of the performer, self-occlusion, etc. For the occluded parts of the performer, there will be no corresponding image data for representing those parts in the virtual, mixed, or augmented reality.

Whilst this would not be a problem were the viewer to view the content from the same viewpoint as that from which the content was captured, it is unlikely that the viewer would choose to view the content in such a manner. For example, several known HMDs provide six-degrees of freedom tracking, and thus allow virtual objects (and environments) to be viewed from all manner of viewpoints. As the viewer changes their viewpoint, there will be parts of the performer that were not captured by the camera, and for which there is no image data for representing those parts. The occluded parts may appear as gaps in the image, making the performer appear less realistic and thus reducing the immersion for the viewer.

One solution to this problem involves manually painting the occluded parts of the performer into the scene, using an image editing tool such as Photoshop™. Any objects occluding the performer may be represented graphically and placed at an appropriate position in the 3D reconstruction of the environment. The painted-in parts may then be displayed to the viewer, should the viewer's viewpoint change so as to include them. As will be appreciated, filling in the missing image data in this way is a time-consuming process.

Another solution to this problem involves capturing multiple takes and removing occluding objects from the different takes. In this way, any image data missing from one take (due to occlusion) can be supplemented by image data provided in a subsequent take. However, as will be appreciated, capturing multiple takes is not always practical, and in some situations, may interfere with the performer's performance—e.g. where the performer is supposed to interact with a now-removed object.

The present disclosure seeks to address, or at least alleviate the above-identified problems.

SUMMARY OF THE INVENTION

The present disclosure is defined by the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
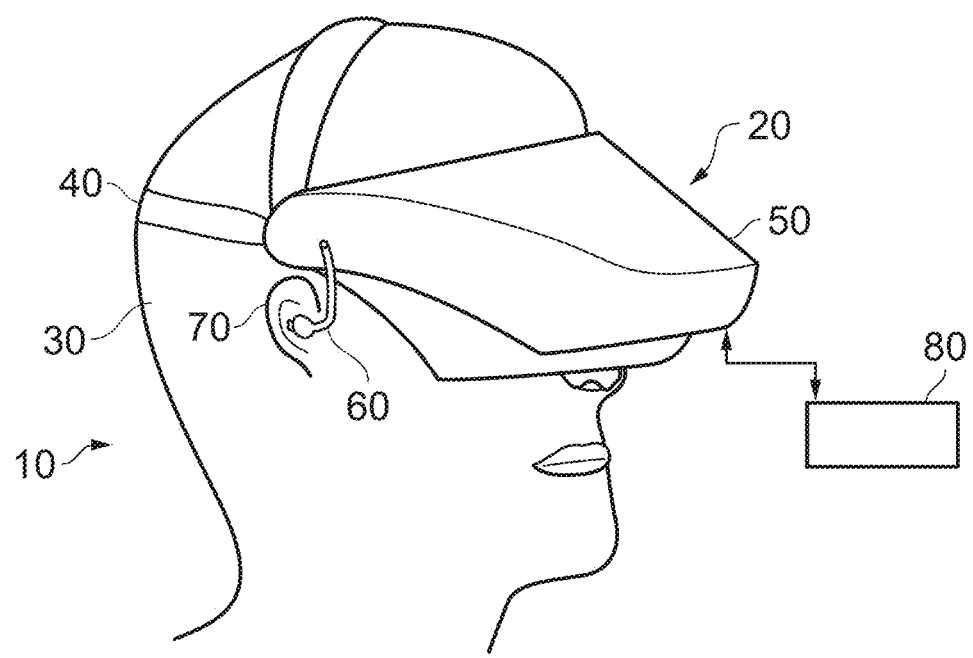
FIG. 1 shows schematically an example of a head-mountable display.

Referring now to FIG. 1, a user 10 is wearing an HMD 20 (as an example of a generic head-mountable apparatus). The HMD comprises a frame 40, in this example formed of a rear strap and a top strap, and a display portion 50.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera (not shown) may capture images to the front of the HMD, in use. A Bluetooth® antenna (not shown) may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

The HMD described in FIG. 1 may be used to display immersive video to a viewer. The term immersive video is used herein to refer to video content suitable for viewing in virtual, augmented and or mixed reality. Generally, the video will correspond, at least in part, to video of a real scene, including one or more real-world objects Immersive video may differ from game content in that images of the real-world objects have been used to represent those objects in 3D, to the viewer. However, immersive video may still allow a viewer to interact with objects represented in a virtual, augmented or mixed reality environment.

As mentioned previously, the immersive video may correspond to a video of a performance. Examples of immersive video content include, for example, 'Joshua Bell VR Experience', 'Tom Grennan VR', etc. available on the PS4. For contextual purposes, the embodiments described herein will largely be described in relation to the generation and display of immersive video content in VR.

As mentioned previously, there exist numerous techniques for generating immersive video content. These include, for example, capturing a scene as a volumetric video by positioning multiple cameras around a subject; light-field rendering; and capturing a stereoscopic video of a scene and projecting this onto a mesh within a 3D reconstruction of the scene. The present disclosure is concerned with the latter of these techniques.

As will be appreciated, if a video games console is to be used to render immersive video, the computational power available may be somewhat limited. For example, it may not always be feasible to generate a complete three-dimensional mesh of a subject and to adjust the display of that mesh in response to changes in a viewer's viewpoint.

Other techniques may rely on the blending of multiple source images of a subject, without the need for generating a complete reconstruction of the subject. An example of such a technique is disclosed in GB1903702.7, which involves dynamically generating a stereoscopic texture of an object from a set of source images, with the stereoscopic texture being generated in accordance with a viewer's viewpoint relative to the subject. That is, in GB1903702.7, the texture is dynamic in that the texture is distorted based on the viewer's viewpoint. While this technique provides a higher quality result for a wider range of subject there is generally a higher rendering overheard for generating images in this way, in real-time.

The present disclosure relates to the projection of a stereoscopic texture onto a simple three-dimensional mesh. The stereoscopic texture may be 'fixed' in the sense that the texture does not vary based on the viewer's viewpoint. Rather, the configuration (e.g. position, orientation, shape) of the mesh onto which the texture has been applied may be varied in response to changes in the viewer's viewpoint. Generally, rendering the subject in this way is faster, since there is less (or no) reliance on calculating complex meshes or image distortions. Moreover, the combination of stereoscopic texture projected onto a mesh provides the illusion of volumetric roundness. However, this illusion is only convincing for a limited range of subjects, and a limited range of viewing positions of those subjects.

This trade-off between rendering complexity and freedom of movement may be acceptable where a viewer is expected to view the content from a limited range of viewing positions. For immersive video, it is generally expected that a viewer will view the content from a sitting position and is therefore unlikely to move their head too far from the original viewpoint at which the viewpoint was captured. Hence, for such content, projecting stereoscopic texture onto a mesh may providing a convincing, immersive experience.

Figure 2:
FIG. 2 shows an example of an image of a subject in a scene.
Figure 3:
FIG. 3 shows an example of a mesh onto which stereoscopic video may be projected.

As mentioned previously, when capturing video of a subject in a scene, it may be that parts of the subject are occluded as a result of objects located in front of the subject. An example of this is shown in FIG. 2, which corresponds to a video frame taken from "Joshua Bell VR". The video frame in FIG. 2 may correspond to a left-eye or right-eye image for display at an HMD. The video frame comprises a reconstructed environment (in this case, Lyndhurst all) and a three-dimensional mesh onto which the stereoscopic video of the performer has been projected. The three-dimensional mesh is shown in FIG. 3 as mesh 302, located at a position corresponding to the position of the performer in the reconstructed environment.

In FIG. 2, it can be seen that a part of the performer's legs and hand is occluded by the piano, with part of the performer's foot also being occluded by the stool. As will be appreciated, as the performer moves during his performance, the occlusion of these part may vary to an extent. In any case, there will still be parts of the performer for which there is no corresponding image data (i.e. pixels) for representing those parts. Typically, the camera used to capture the content is static, and so the missing pixel information cannot be obtained by moving the camera to a new viewpoint where those parts are no longer occluded. As will be appreciated, a viewer viewing content in VR is likely to feel nauseous if their viewpoint changes without them having made the corresponding physical motion.

Generally, a viewer viewing the performer in the immersive video from the same viewpoint as the viewpoint from which the video was captured will not notice that pixel information is missing for some parts of the performer. However, the HMD may provide e.g. six degrees-of-freedom tracking, and so allow the viewer to view the performer from viewpoints other than those from which they were filmed. As the viewer changes their viewpoint, the occluded parts of the performer will come into view but will appear as gaps since there are no pixels in the stereoscopic video representing those parts (a further example of this is shown in FIGS. 8A-8D). Clearly, displaying the performer in such a manner is immersion-breaking for a viewer.

Figure 4:
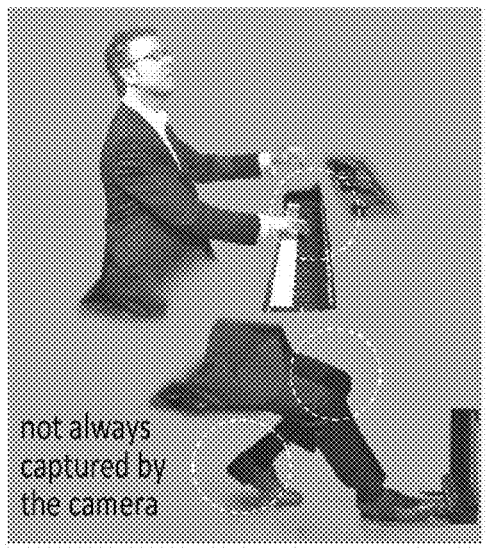
FIG. 4 shows an example of occluded parts of a performer in an image that have been painted in manually.

One solution to this problem is to manually paint in the occluded regions using photo-editing software such as Photoshop™. An example of this is shown in FIG. 4, where it can be seen that the previously occluded parts of the performer have been painted in, onto the video texture. Should the viewer change their viewpoint such that the previously occluded parts come into view, the corresponding painted-in parts can be displayed to the viewer. However, as will be appreciated, painting the occluded parts in this way is a time-consuming process and is subject to human error.

Figure 5A:
FIG. 5A shows an example of a first take of a performer in a scene.
Figure 5B:
FIG. 5B shows an example of a second take of a performer in a scene with some of the objects occluding the object in the first take having been removed from the scene.

Another solution to this problem involves capturing multiple takes of the performer, with occluding objects being removed for different takes. An example of this is shown in FIG. 5A, which shows a first take in which a drummer is occluded by a bass drum and high tom. In FIG. 5B, the same scene is shown, captured from the same viewpoint, but with the occluding objects removed. The image data corresponding to the non-occluded parts of the drummer in FIG. 5B can then be used to fill in the image data missing from the first take. However, as will be appreciated, capturing multiple takes of the performer is not always practical, such as in a live concert, and furthermore if the performer's actions did not perfectly synchronise between takes then it would be very obvious.

Figure 6:
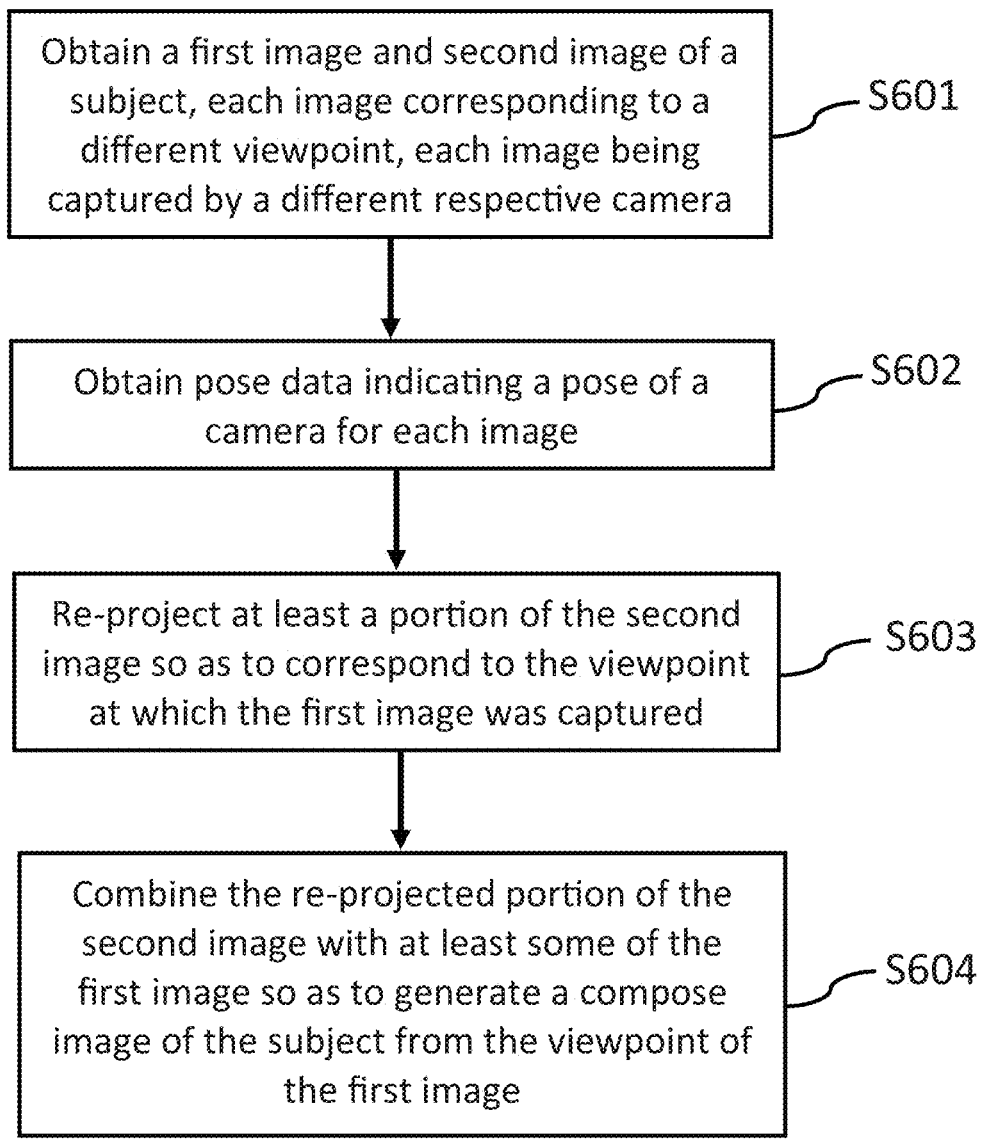
FIG. 6 shows an example of a method for generating an image of a subject in accordance with the present disclosure.

It would therefore be desirable, when generating immersive video, to obtain enough image data of the performer, such that changes in a viewer's viewpoint relative to the viewpoint at which the content was filmed, does not result in gaps appearing in the viewed content. It would further be desirable if this image data could be obtained without having to capture an excessive number of takes or having to generate complete 3D reconstruction of the performer. More generally, it would be desirable if a high-quality immersive video, viewable from a range of viewpoints, could be obtained without requiring an excessive rendering overhead. A method for obtaining such an immersive video will now be described in relation to FIG. 6.

At a first step, S601, a first and second image of a subject in a scene is obtained. Each image corresponds to a different respective viewpoint of the subject. In other words, the position and/or orientation of the camera relative to the subject is different for each of the images. Each image may comprise a stereoscopic video image captured by a stereoscopic camera. The stereoscopic video image may be a live action video of a person performing e.g. music or acting. Each image may comprise an e.g. RGB or YUV image, for example. The video may be 'live' in the sense that the video corresponds to a real-life event that was performed live at the time of recording.

In additional or alternative examples, at least some of the cameras may comprise monoscopic cameras (i.e. comprising one image sensor and one or more lenses for focussing light onto that sensor). These may be used in combination with an additional depth sensor, such as a time-of-flight and/or structured-light sensor. In such examples, the field of view of the depth sensor will at least partially overlap with the field of view of the monoscopic camera, such that depth data for the subject can be obtained in addition to image data (e.g. colour pixels).

Each image is captured by a different respective camera. The first image may correspond to an image captured by a primary camera, with the viewpoint of the primary camera corresponding to the viewpoint at which a viewer is expected to view the content from (i.e. the primary viewpoint). The primary viewpoint may correspond to being directly in front of the subject and correspond to the default viewpoint at which the immersive video is displayed to the viewer. The second image may be captured by an additional camera located at a different position to the primary camera. The second image provides supplementary image data for filling in parts of the subject occluded in the first image, as will be described below.

The use of different cameras for capturing each image means that multiple views of the subject can be captured simultaneously. For example, if the subject is a performer, the performer need only perform once, in order for image data to be captured from the different viewpoints. As will be appreciated, it may be difficult for the performer to recreate the exact same performance on multiple takes, were the same camera to be moved to different poses for the different takes.

In some examples, each image may correspond to an image of the subject located in front of a green screen. The parts of the images corresponding to the green screen can be removed, allowing the subject to be isolated from its environment. The use of a green screen enables high-quality soft edges of the subject to be captured, which can then be represented in 3D. The scene may also include a number of green objects that can easily be identified in the obtained images and removed accordingly.

In the first image, at least some of the subject is occluded to a greater extent than the same part of the subject in the second image. That is, at least some of the subject is occluded in the first image and not in the second image by virtue of the different viewpoints that each image corresponds to. The occlusion of the subject in the first image may arise as a result of e.g. an object that is located in front of the subject from the perspective of the primary camera. In examples where the subject comprises a performer, the object may include e.g. an instrument that the subject is interacting with. Alternatively or in addition, at least some of the subject may be occluded by the subject itself, i.e. so-called self-occlusion, and/or parts of the environment in which the subject is located.

As mentioned above, the second image may correspond to an image captured by an additional camera that is located at a different position to the primary camera. In some examples, there may be multiple additional cameras, wherein each additional camera corresponds to a different viewpoint of the subject. Each additional camera may be arranged so as to capture image data for a portion of the subject that is occluded in one or more of the other images captured by the other additional cameras. Ultimately, the number and configuration of the additional cameras will depend on the amount of image information that e.g. the camera operator intends to recover. In the present disclosure, the term 'additional image' and 'second image' are used interchangeably and without limitation on the number of further images that may be captured.

Figure 7:
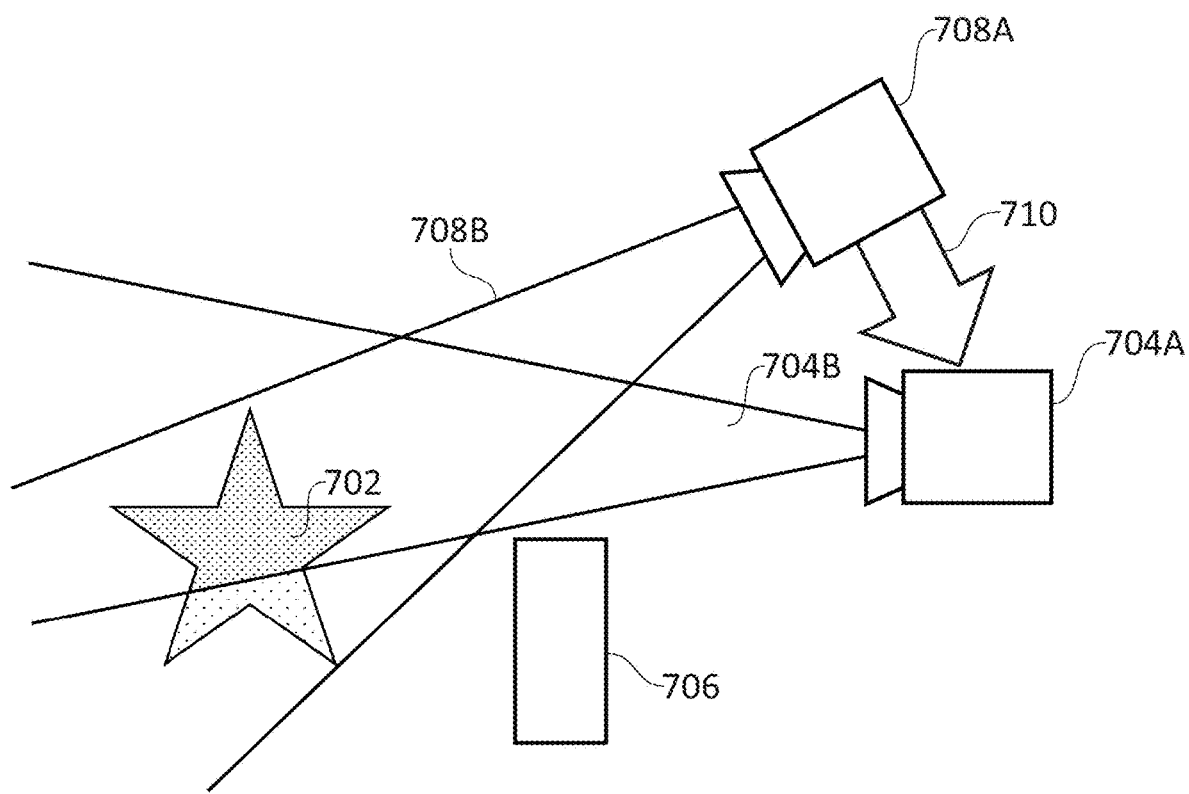
FIG. 7 shows schematically an example of a subject in a scene wherein a portion of the subject is occluded from the perspective of a primary camera but not from the viewpoint of an additional camera.

An example of the differing degrees of occlusion for different camera viewpoints is shown in FIG. 7. In FIG. 7, a subject 702, in the form of a star, is shown as being positioned in front of a primary camera 704A, having field of view 704B. From the perspective of the primary camera 704A, the subject is occluded by an object 706 that is located between the primary camera 704A and the subject 702. However, the part that is occluded for the primary camera 704A is not occluded from the perspective of an additional camera 708A located above the primary camera 704A and oriented towards the subject 702. In FIG. 7, additional camera 708A has a corresponding field of view 708B (although the FoV of different cameras can, in principle, be different). Hence, the parts of the subject 702 occluded in images captured by the primary camera 704A will not be occluded in images captured by the additional camera 708A. The image data obtained from the additional camera 708A can thus be used to supplement the image data that is missing (due to occlusion) from the images obtained by the primary camera 704A.

Figure 8C:
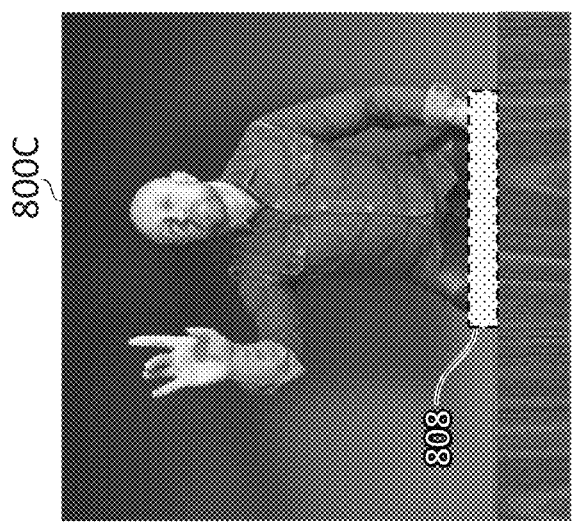
FIGS. 8A-8C show examples of images of subject in a scene from two different viewpoints, with subject image detail missing for one of the viewpoints due to occlusion.
Figure 8B:
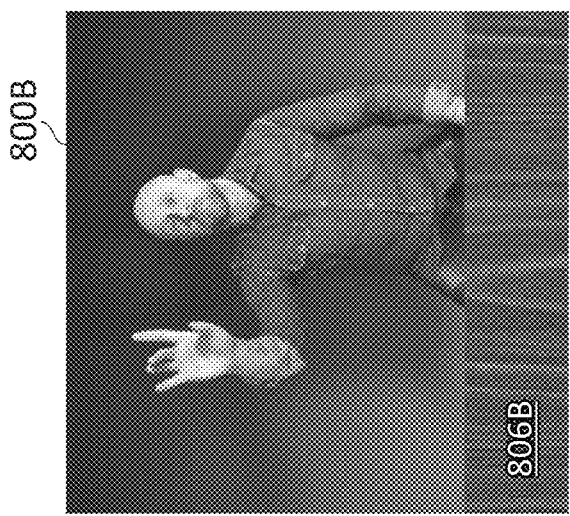
Figure 8A:
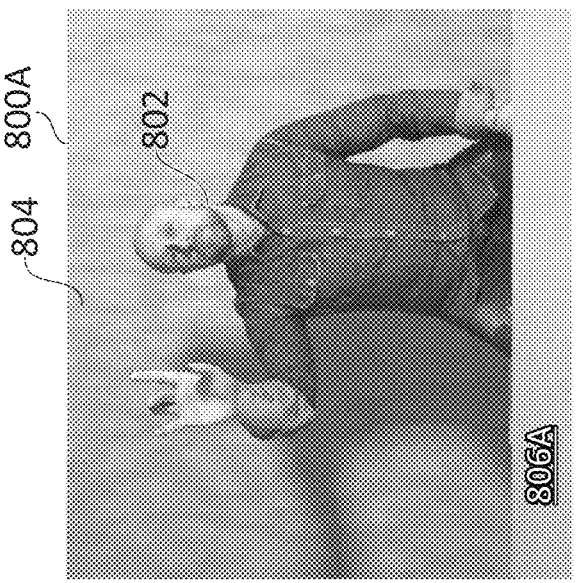

A further example of the variation in occlusion for different viewpoints is shown in FIGS. 8A-8C. FIGS. 8A-8C show an example of the type of content that is suitable for being captured in accordance with the present disclosure.

In FIG. 8A, the subject 802 corresponds to an actor making a gesture with their right hand. The actor is sat in front of a green screen 804 and behind a green table 806A. FIG. 8A shows the actor from the perspective of the primary camera, i.e. FIG. 8A corresponds to a first image 800A captured by the primary camera. In FIG. 8A, at least some of the actor's hand and thighs is occluded by the table 806A.

FIG. 8B shows the actor from the same perspective, but with the background colour changed and the desk rendered as separate 3D object (i.e. virtual object) 806B. The image 800B shown in FIG. 8B may correspond to how the actor actually appears to a viewer when viewing the content in virtual reality from a viewpoint that corresponds with the viewpoint of the primary camera (e.g. from the same height as the primary camera).

FIG. 8C shows the same scene as that shown in FIG. 8B, but from a different viewpoint. In FIG. 8C, the viewpoint corresponds to a viewpoint that is higher than the viewpoint of the primary camera. This view may be presented to a viewer as a result of them having raised their head whilst viewing the VR content. As can be seen in FIG. 8C, there is a gap region 808 corresponding to the parts of the actor that were occluded in the first image. Clearly, it is undesirable to present the actor to the viewer in this manner, since the viewer will expect to performer's hands and legs to appear in the gap region 808 (which in FIG. 8C, is displayed as the background).

Figure 8D:
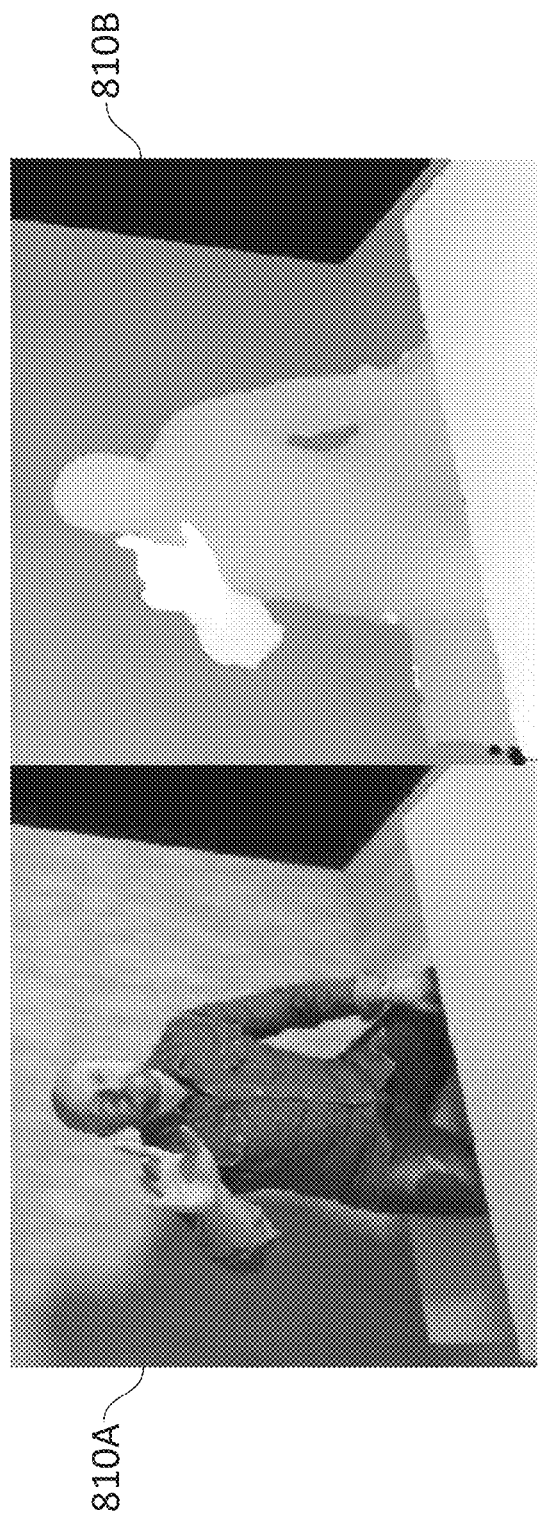
FIG. 8D shows an example of additional image of the subject that may be used for recovering image detail lost due to occlusion.

FIG. 8D shows an example of an additional image 810A of the actor that has been captured from an alternative viewpoint. In FIG. 8D, the viewpoint corresponds to a viewpoint that is to left of, and above the primary viewpoint.

It can be seen in FIG. 8D that more of the previously occluded parts of the actor are visible in the image captured from the viewpoint of the additional camera. The corresponding image data (i.e. pixels) from this image can thus be used to fill-in at least some of the gap region 808 of image 800C.

In FIG. 8D a corresponding depth map 810B of the scene is also shown. The additional image may comprise a stereoscopic image and so this depth map 810B may be obtained by performing stereo-matching on the image pair forming the stereoscopic image. The use of the depth map 810B will be described in more detail, later.

Returning to FIG. 6, at a second step, S602, camera pose data indicating a pose of the cameras that captured the first and second images is obtained. The camera pose data defines, for each image, the position and/or orientation of the camera that captured that image, relative to the subject.

The camera pose data may be obtained during the capture of the images. For example, the distance of the subject from each camera may be measured using e.g. a time-of-flight sensor. Generally, each camera will be static during the capture process, and so the pose of each camera may be determined using known photogrammetry techniques. This may involve, for example, using a test subject, such as a chessboard, to determine the extrinsics of the camera. The intrinsics of the camera may be known in advance (e.g. the focal length of the camera) or determined in any suitable manner. The camera pose data for a given camera may be defined as metadata that is stored in association with the images captured by that camera. In some examples, the cameras form part of a stereoscopic camera rig that is static during filming, and so the pose of the cameras need only be calculated once.

At a third step, S603, at least a portion of the second image is re-projected so as to correspond to the viewpoint from which the first image was captured, the portion of the second image being re-projected based on the difference in camera poses associated with the images. In FIG. 7, the re-projection of the image captured by the additional camera so as to correspond to the viewpoint of the primary camera is indicated at arrow 710. The re-projection may be performed using a distortion shader, as will be described below.

In some examples, the portion of the second image that is re-projected may correspond to the pixels of the second image that correspond to the subject. For example, pixels in the second image corresponding to a green screen and objects occluding the subject may be identified and removed from the second image. The reprojection may then be applied to the remaining pixels corresponding to the subject. The background regions and/or occluding objects in the second image may be identified based on colour. For example, if green screens and green objects are used during filming, then pixels in the second image that correspond in colour can be separated and removed from the second image. The resulting image may correspond to e.g. a chroma-keyed RGBA image.

As will be appreciated, in some examples, there will be multiple additional images, each captured by a different camera at different location within the scene. In such examples, step S603 involves re-projecting a portion of each additional image to correspond to the viewpoint of the first image (again based on difference in camera pose for the additional camera and the primary camera). The portion that is re-projected for each additional image may correspond to the image pixels representing the subject in that image.

Re-Projection

Re-projecting at least a portion of the second image to correspond to the viewpoint from which the first image was captured comprises obtaining depth data associated with the second image. In examples where the second image comprises a stereo-image (e.g. left and right images), this depth data may be obtained via stereo-matching. In alternative examples, where a separate depth sensor is used, this depth data may be obtained from a depth sensor, wherein the field of view of the depth sensor overlaps with the field of view of the additional camera that captured the second image.

Having obtained the depth data, a polygonal mesh of the subject may be generated based on the second image (i.e. colour information) and the depth data associated with the second image. The polygonal mesh may be generated without requiring a prior step of generating a point cloud from the first and second images, and the depth data associated therewith. The polygonal mesh may be generated by applying a two-dimensional grid to the second image and determining a variation in depth across each unit of the two-dimensional grid. The variation in depth across each unit may be used to generate a mesh with a tessellation density that varies in accordance with the variation in depth across each unit of the grid. The grid may correspond to e.g. a uniform triangular grid. The resulting mesh may correspond to e.g. a triangular mesh.

The re-projection may further comprise re-projecting at least some parts of the generated polygonal mesh so as to be perpendicular to the direction corresponding to the first viewpoint. That is, at least some portions of the generated mesh may be re-projected so as to face the primary camera (parallel with the view plane defined by the primary camera). This may involve, for example, re-projecting vertices of the generated mesh in accordance with the pose of the primary camera. In examples where the generated mesh is a triangular mesh, this may involve re-aligning at least some of the triangles in the mesh, such that in screen space, the x and y values of the triangles are preserved but the z-values are set to be the value that is closest to the viewpoint of the primary camera.

Having re-projected at least some portions of the generated mesh, a texture for applying to that mesh may be generated. The texture may be generated by parallax mapping the second image onto the re-projected image (or rather, the relevant portion of the second image onto the re-projected mesh generated for that portion). A parallax shader may be used for performing this mapping. The texture may be obtained from the pixels in the second image corresponding to the subject. This texture may correspond to image pixels representing the subject (with the background and any occluding objects removed as above).

In examples where multiple additional cameras are positioned around the subject, the method may comprise generating meshes for the images captured by each additional camera, with those meshes being re-projected and having texture applied thereto, in accordance with the above-described techniques. For each additional image, regions not corresponding to the subject may be removed, with re-projected meshes being generated just for the parts of the image corresponding to the subject.

An example of the above-described mesh generation process is described in more detail in GB1903702.7, p. 12-14, which describes generating meshes from source images and re-projecting those meshes based on the viewpoint of a virtual camera. The same process may be applied to the images captured by the additional camera(s) of the present disclosure, so as to re-project portions of those images to the viewpoint of the primary camera.

Figure 9:
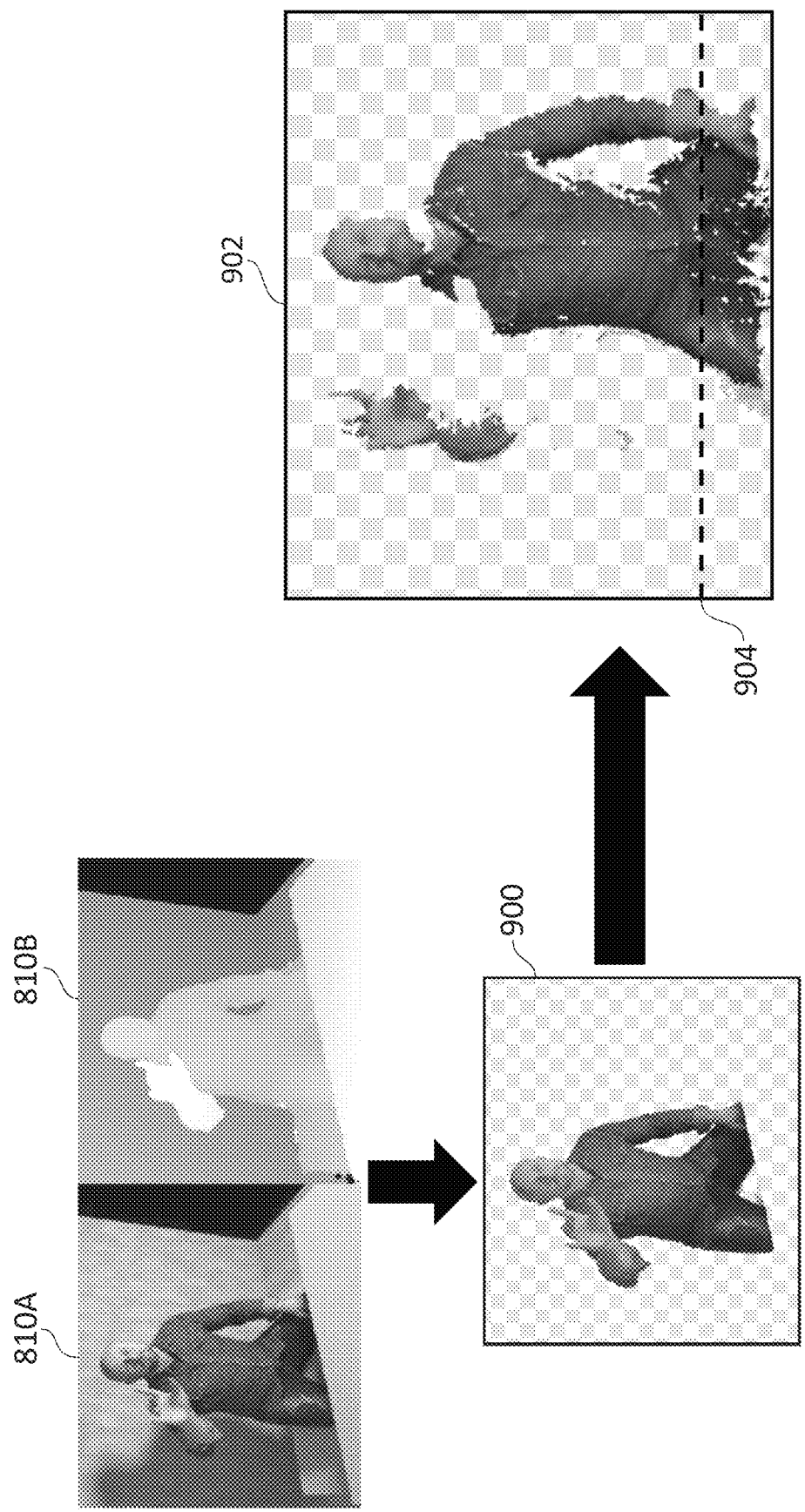
FIG. 9 shows an example of a re-projection process for recovering image data lost due to occlusion.

FIG. 9 shows an example of the additional image shown in FIG. 8D having been re-projected in accordance with the present disclosure. In FIG. 9, a chroma-keyed RGBA image 900 of the subject has been generated from the RGB information provided by the additional image and the corresponding depth map. The chequered region corresponds to a transparent region, with the background and desk in the original additional image having been removed.

In FIG. 9, the chroma-keyed RGBA image has been re-projected so as to correspond to the viewpoint of the primary camera (thereby forming re-projected image 902). In FIG. 9, it can be seen that there are gaps in the re-projected image. This is due to some portions of the actor being visible from the viewpoint of the additional camera but not from the viewpoint of the primary camera. Hence, these portions are not represented in the re-projected image. In FIG. 9, a dashed line 904 is shown to indicate the position of the table in the first image (as in image 800A). That is, the image data below the dashed line corresponds to image data that was not obtained in the first image, due to those parts being occluded in the first image. It can therefore be seen in FIG. 9, that at least some of the occluded subject detail (i.e. thighs and hand) has been recovered from the re-projected second image.

It will be appreciated that, where multiple additional images are captured by additional cameras, more and more subject detail may be recovered from the re-projected images.

Combination

Returning to FIG. 6, at a fourth step S604, the re-projected portion of the second image is combined with at least some of the first image so as to form a composite image of the subject from the viewpoint of the first camera. In some examples, this may involve combining the portions of the first image corresponding to the subject with the re-projected portion(s) of the second image corresponding to the subject. That is, any regions in the first and second images corresponding to the background or foreground objects may have been removed, prior to the combination of the two images. For example, the first and second images may both correspond to chroma-keyed RGBA images of the subject.

The re-projected portion of the second image provides image data for at least some of the occluded part or parts of the subject in the first image. That is, at least some of the pixel information missing for the first image is recovered by re-projecting a corresponding portion of the second image and blending the re-projected portion with the first image.

Figure 10:
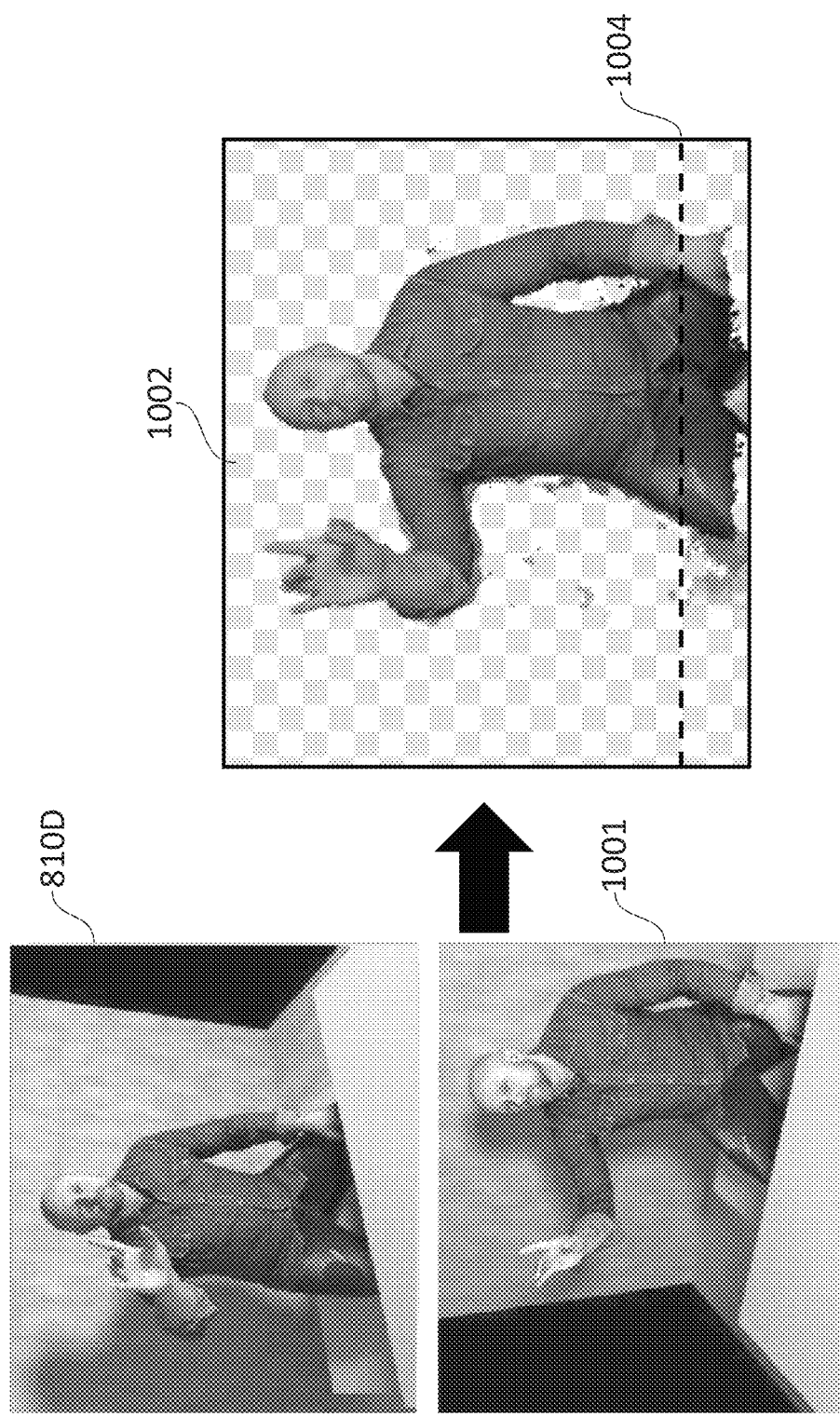
FIG. 10 shows an example of a composite image generated from a first image and additional images.

An example of this combination process is shown in FIG. 10, which shows the second image 810D and a further additional image 1001 (i.e. a third image) of the subject. In FIG. 10, a composite image 1002 is shown, with the composite image comprising the first image blended with the second and third images 810D, 1001. In FIG. 10, the combination has been performed using the portions of each image identified as corresponding to the subject.

In FIG. 10, the dashed line 1004 corresponds to the position of the furthest edge of the table in the first image, i.e. the upmost edge at which occlusion of the subject by the table begins. As can be seen in FIG. 10, at least some of the previously occluded parts of the subject have been recovered, with more of the subject's thighs and hand being visible in the composite image. While these parts of the subject may appear as occluded in the immersive video when viewed from the same viewpoint as the primary camera, the recovered image detail may be made viewable to a viewer, as their view of the subject changes accordingly.

Figure 11:
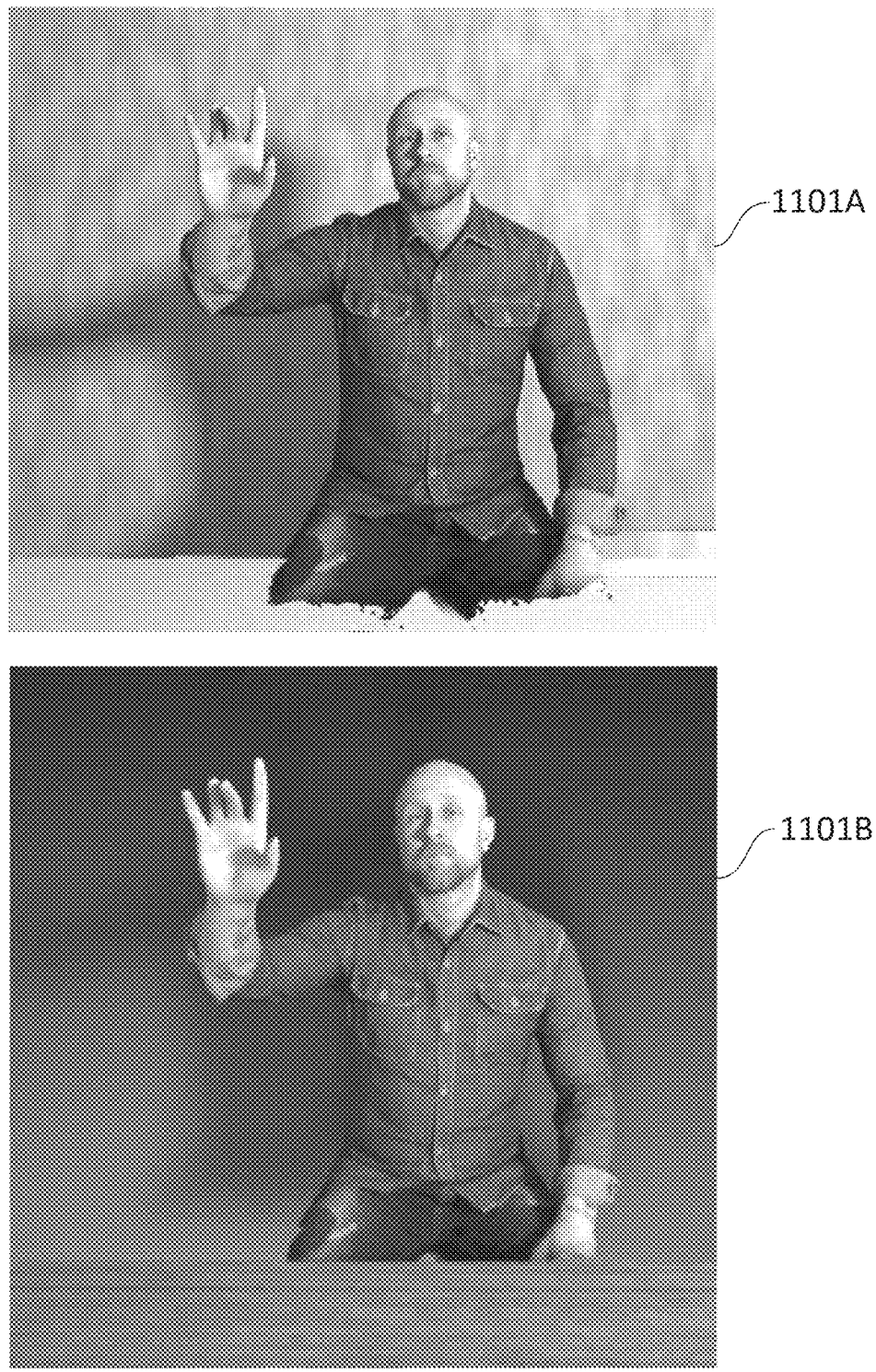
FIG. 11 shows an example of a composite image of a subject for displaying as part of an immersive video.

FIG. 11 shows an example of a composite image 1101 from the same viewpoint as that shown for image 800C. That is, the image shown in FIG. 11 corresponds to the same image as that shown in FIG. 8C, but with at least some of the occluded parts having been filled in by the re-projected portions of the second and third images 810D, 1001. In the top image 1101A of FIG. 11, the composite image is shown in the environment in which the content was captured. In the bottom image 1101B of FIG. 11, the composite image is shown in a virtual environment with the background having been replaced with a virtual background and a virtual representation of the table having been positioned in front of the subject.

In some examples, combining the re-projected portion of the second image with at least some of the first image so as to generate a composite image comprises generating a stereoscopic image from the first image and re-projected portion of the second image. As mentioned above, the first and second images, as well as any additional images may comprise stereoscopic images, and so the combination of these images may result in a composite stereoscopic image. The images shown in FIGS. 8A-11 may correspond to one of the images in a corresponding stereoscopic image.

In alternative or additional examples, the first and second images (and any additional images) may not comprise stereoscopic images. In such examples, a composite stereoscopic image may be simulated. For example, the depth map could be used to generate a second eye-image by re-projecting the composite image.

The composite image may be displayed at an HMD as part of a real (e.g. augmented reality) or virtual scene (virtual or mixed reality). The real or virtual scene may form part of an immersive video for displaying to a viewer.

In some examples, the above-described process may be used for non-VR applications, such as e.g. calculating new camera angles for conventional 2D movies (captured with at least two cameras).

In examples where the composite image comprises a stereoscopic image, the composite image may be displayed at a virtual display screen (VDS) that is positioned within a virtual environment displayed at an HMD. That is, the stereoscopic composite image may be generated for display at a VDS. The VDS is referred to as "virtual" because it does not physically exist in space, but rather is created or simulated optically by the operation of the HMD display. The virtual display screen subsists in three dimensional space (in a virtual sense) around the position in space of the HMD wearer, such that the HMD wearer sees a current portion of VDS according to the HMD orientation. If the pose of the viewer corresponds to the pose of the primary camera, then it may be that part of the VDS is occluded by an object located in front of the VDS. Whereas, as the orientation of the HMD changes, some of the previously occluded parts of the VDS may come into view, and the corresponding image data (recovered as above) made viewable.

The VDS may comprise a three-dimensional mesh that approximates a depth profile of the subject. The stereoscopic composite image may form a video texture that is projected onto this mesh. The depth profile of the subject may be approximated based on the depth data obtained in any of the previously described manners. The mesh may be relatively simple in that the mesh is largely planar, but approximately conforms to the shape of the subject at locations where the subject interacts with other objects or surfaces (e.g. where their feet contact the floor, their hands contact a table, etc.). Generally, the mesh may be planar, part-spherical, curved or another shape.

The VDS is set at a position within a virtual environment in which the subject is to be represented. The VDS may be set at a depth within the virtual environment that corresponds to the depth of the performer. That is, at a depth that corresponds to the distance of the subject from the primary camera, during the capture of the video content.

The virtual environment may correspond to a real world environment or a completely virtual environment. Here, "virtual environment" corresponds to an environment that is represented graphically, which may correspond to a graphical reconstruction of a real, physical environment, or a completely simulated environment. Virtual environments are typically displayed as part of virtual or mixed realities. The VDS may be superposed on top of (or blended with) the virtual environment. It will be appreciated that, where the virtual environment corresponds to a real world environment, this environment need not correspond to the actual environment in which the content was captured. For example, if the stereoscopic composite image is of a performer, it may be desirable to represent them in a 3D reconstruction of a famous studio, which is not necessarily convenient to actually film the performer in.

In some examples, the VDS may be set at a position within a real-world environment and not a graphical representation of that environment. For example, in an augmented reality application, it may be that the depth of one or more objects or surfaces proximal to a wearer of the HMD is known, and that this information is used to control where the VDS is displayed (albeit as part of a virtual image) to the viewer. The stereoscopic composite image may then be projected onto this mesh as a video texture, such that the e.g. performer appears to be performing for the viewer, at the position of the VDS.

An example of a VDS is shown in FIG. 3 (labelled as mesh 302), which corresponds to the mesh onto which the stereoscopic video of the pianist in "Joshua Bell VR" is projected. In FIG. 3, the remainder of the scene (i.e. Lyndhurst Hall) is represented as a 3D geometric scene with the which the VDS has been blended. In FIG. 3, the scene corresponds to a panoramic spherical image of Lyndhurst Hall that has been projected as texture onto a low-poly 3D model of that space. It will be appreciated that the VDS may be represented in any type of reconstructed environment, real or imaginary.

As can be seen in FIG. 3, the shape of the mesh is more complex at the parts where the performer's hands interact with the piano. This is to ensure that the performer's hands appear to hit the keys of the piano from every viewing angle. It can also be seen that the mesh is more complex at the region corresponding to the point of contact between the performer's feet and the floor. This is to ensure that the performer does not appear to float above the floor in the final rendering.

In some examples, the method may further comprise detecting a change in viewpoint of a viewer of the stereoscopic composite image and controlling the configuration of the VDS based on the detected change in viewpoint of the stereoscopic image by the viewer. This may involve, for example, twisting at least some of the VDS, such that the subject, e.g. performer, remains oriented towards the viewer, as the viewer's view of the performer changes. In this way, a viewer may perceive that the subject's performance is being directed at them. It is noted that the generation and use of virtual display screens for the purposes of displaying stereoscopic images is described extensively in GB1715555.7, and that the virtual display screens disclosed herein may be generated and used in the same manner.

While the VDS has been described above as being positioned in a virtual environment, it will be appreciated that in some examples, it may be desirable to generate a 3D reconstruction of the object that was at least partially occluding the subject in the first image. The graphical reconstruction of the object may then be positioned at a location within the virtual environment corresponding to the position of that object relative to the subject in the actual environment (i.e. the environment in which the content was captured). In some examples, it may be that the reconstruction corresponds to a simpler version of the actual occluding object, and so is less intensive in terms of the GPU required to render that object. For example, the object may be completely artificial, without e.g. an image of the object having been captured and projected as texture onto a corresponding polygonal mesh.

Self-Occlusion

Figure 12:
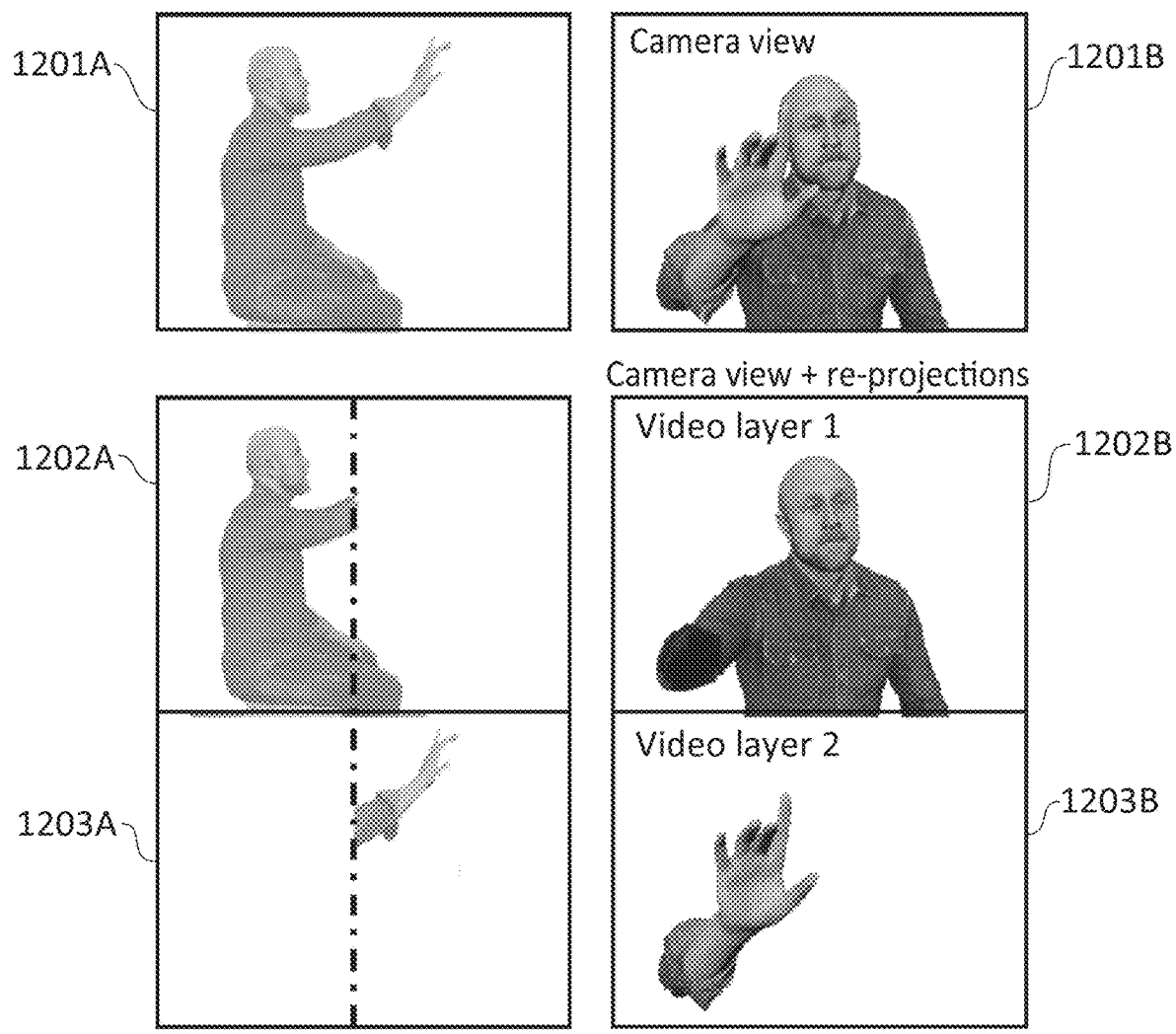
FIG. 12 shows an example of self-occlusion and the separation of the composite image into two parts based on the self-occlusion.

In addition to the subject being occluded by foreground objects such as e.g. instruments, props, parts of the environment, it may be that pixel information is missing for some of the subject due to self-occlusion. FIG. 12 shows an example of how the previously described subject may be self-occluded from certain viewpoints. In the upper left image 1201A, the subject is shown from a side-on view, which corresponds to an image of the subject captured from a corresponding viewpoint. In the upper left image the subject's right shoulder and ear are visible.

In the upper right image 1201B, the subject is shown from a forward facing view corresponding to the view of the subject in image 810D shown in FIG. 8D. As can be seen in the upper right image, at least some of the performer's face, arm and shoulder is occluded by the performer's right hand. As a result of this, it may be difficult to represent to the subject using a single video mesh, e.g. where the mesh is planar and has a relatively uniform (e.g. constant) depth. If a relatively simple mesh is used, then it may be that only the portion of the actor corresponding to their right hand and forearm is projected onto the mesh. Should the viewer change their viewpoint, it may be that there is no mesh surface available for displaying the previously occluded portions of the performer. For example, in the upper right image, it may be that, as the viewer moves their head to one side, the viewer cannot see the subject's right shoulder or right ear.

Hence, in some examples, the method further comprises generating a plurality of virtual display screens (VDSs), each being arranged to display a different portion of the composite image. Each virtual display screen may approximate the depth profile of the corresponding portion of the subject. The depth profile of the corresponding subject portion may be obtained from e.g. the stereoscopic images captured by the primary and additional camera(s) and/or depth sensors described previously. The relative depth of the virtual display screens may correspond to relative depth of the corresponding portions of the subject. For example, the first VDS may be positioned in front of the second VDS, when viewed from the viewpoint of the primary camera.

In the example of FIG. 12, this may correspond to generating a first VDS that approximates the size and shape of the subject's hand and forearm, and a second VDS that approximates the size and shape of the remainder of the subject's body. For the second VDS, the mesh may approximate the shape of the subject more closely for the arm portion, but less closely for the e.g. torso and face of the subject. This is because the arm portion is closer to viewer and so more of the occluded parts will come into view as the viewer's viewpoint changes, compared with the body portion (due to parallax). The remainder of the second VDS may be substantially flat, e.g. from the right shoulder to the left shoulder. The two virtual display screens may be blended at e.g. the shoulder, with the overall virtual display screens approximating the shape of the subject. It will be appreciated that this configuration of virtual display screens is a non-limiting example.

The virtual display screens generated for each portion may be set at positions within the virtual environment corresponding to the relative positions of the corresponding portions of the subject in the actual scene. For example, the x and y coordinates of the virtual display screens may correspond with the x and y coordinates of the pixels of the corresponding portions of the subject in the actual scene. Although in some examples, the virtual display screens may not perfectly align with the corresponding image portions. It may be that the virtual display screens are of a less complex shape than the subject portions, and so extend further in some directions relative to the image portion with which they are supposed to correspond.

In FIG. 12, the central left image 1202A shows how the subject has been divided for the purposes of generating two virtual display screens. In image 1202A, the part of the subject that is located behind the divider is shown. In the lower left image 1203A, the part of the subject that is located in front of the divider is shown. In FIG. 12, it can be seen that the subject has been divided by a vertical plane intersecting the subject's elbow. The divider may correspond to a depth threshold that is used to determine which virtual display screen the pixels of the subject are to be projected onto.

In FIG. 12, it can be seen that video layer 1 corresponds to the pixels located behind the divider, whereas video layer 2, corresponds to the pixels located behind the divider. The video layers shown in FIG. 12 may each be projected onto a corresponding VDS. By projecting the pixels of the subject onto the corresponding mesh, the occluded parts of the subject can be made viewable as the viewer's viewpoint changes. For example more of the performer's face may become visible as the viewer looks to the side of the subject's hand. This is because there is now a mesh surface for displaying those parts of the performer.

In some examples, the method may comprise detecting a first portion of the subject as occluding a second portion of the subject from the perspective of the primary camera and defining a depth threshold based on this detection. This occlusion may be detected based on the depth data associated with e.g. the first image. For example, a sudden jump in depth in an image of the subject (with any background and occluding objects removed) may be identified as corresponding to self-occlusion. Alternatively, the depth threshold may be defined manually, e.g. as a result of having viewed the first image and identifying a portion of the subject as occluding another. In some examples, self-occlusion may be identified in the composite image, based on the depth data associated with the pixels in that image. For example, it may be that pixels are located at the same x and y position in the composite image, but have different z-positions, and can therefore be identified as corresponding to self-occlusion. The positioning of the virtual display screens in the virtual scene may be determined based on the defined depth threshold. For example, with at least one of the virtual display screens being positioned in front of, or behind, the defined depth threshold.

The method may further comprise projecting the pixels of each portion of the subject in the stereoscopic composite image onto a respective corresponding virtual display screen. As mentioned above, the pixels in each image (first, second and any further additional images) may be associated with depth data and so the VDS onto which the pixels of a given image are projected may be determined based on this depth data. Based on this determination, the pixels of each re-projected image may be applied as texture to a corresponding VDS. This may be equivalent to treating the pixels in the composite image as a 3D model and slicing the subject in accordance with the depth threshold. However, once the depth threshold is determined, the composite image need not be reconstructed as 3D model. The depth associated with the pixels in the composite image is not used to represent the subject at the corresponding z-positions, but rather, to determine which VDS (and whereabouts on that VDS) the pixels of the composite image are to be projected on to.

It will be appreciated that composite image described above may be displayed as part of a virtual, mixed or augmented reality image, which itself corresponds to, or forms part of, an immersive video that is viewable at an HMD such as that described in relation to FIG. 1.

While the above described embodiments have been described in relation to generating images for display at an HMD, it will be appreciated that the same techniques may equally be used to render objects in 3D for display at any type of display screen.

In a variant embodiment, it will be appreciated that for self-occlusion and also some green-screen or foreground occlusion scenarios, gaps in the representation of the target object (e.g. the actor 802 in FIGS. 8A-C) may occur because the user moves their view away from the primary viewpoint of the first image. In this case, optionally the first image may be re-projected to the new user viewpoint, and the additional image(s) are similarly re-projected to this new user viewpoint (rather than to the primary viewpoint of the first image).

Hence optionally the method may comprise the step of obtaining a user's viewpoint (for example using a pose detector such as a camera and/or head mounted display with tracking components as described elsewhere herein), and if the user viewpoint deviates from the viewpoint of the first image, the re-projecting step comprises respectively re-projecting, based on the difference in camera poses associated with each image, at least a portion of the first and second/further image(s) to correspond to the user viewpoint, and the combining step comprises combining the re-projected portion of the second image with at least some of the re-projected first image so as to generate the composite image (i.e. at the user's viewpoint).

A computer readable medium having computer executable instructions adapted to a cause a computer system to perform the previously described methods may also be provided. In some examples, the rendering method may be performed at e.g. a games console, and the composite image displayed at the display of an HMD that is in communication with the games console. Alternatively or in addition, at least some of the rendering may be performed at e.g. a server, and the composite image may be provided to the display of an HMD that is in communication with the server via e.g. an internet connection or via a games console that is in communication with the server. Alternatively or in addition, the HMD may perform at least part of the rendering method itself, if it comprises suitable processing means.

In some examples, it may be that the rendering is shared amongst two or more of the server, the games console, or the HMD, with the composite image being relayed if necessary from the games console to the HMD. Ultimately, any combination of server, games console and HMD may be used to perform the rendering, depending on the respective hardware capabilities and the nature of the subject that is being rendered.

Figure 13:
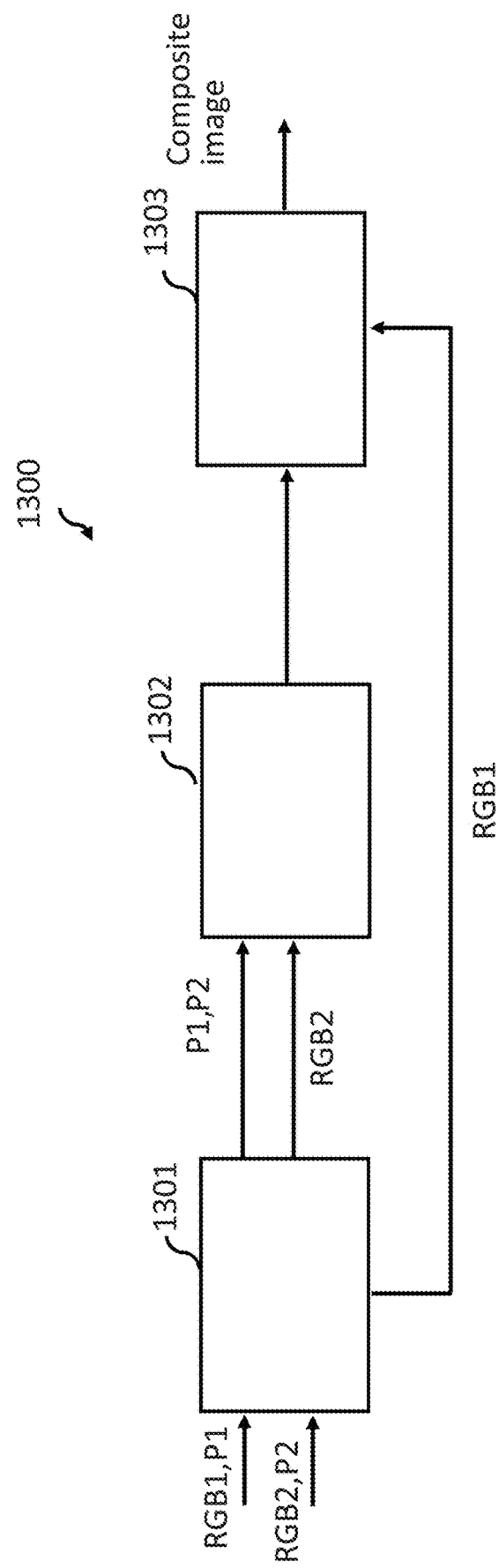
FIG. 13 shows an example of a system for generating an image of a subject in accordance with the present disclosure.

FIG. 13 shows schematically an example of a system 1300 for generating images of a subject in accordance with the present disclosure. The system 1300 comprises an input unit 1301, reprojection unit 1302 and combiner 1303.

The input unit 1301 is operable to obtain images of a subject in a scene and pose data indicating a pose of the cameras that captured the images. In FIG. 13, two input images are shown as inputs to the input unit 1301, the images being labelled RGB1 and RGB2 respectively. The camera pose data associated with the images is labelled as P1 and P2 respectively. The images and corresponding pose data may be obtained in any of the manners described previously in relation to FIG. 6.

The images comprise a primary image captured from a primary viewpoint and one or more additional images captured from additional viewpoints. Each image corresponds to a different viewpoint of the subject, with the primary image corresponding to a viewpoint for which at least some of the subject is occluded. An example of this occlusion was described previously in relation to FIGS. 7 and 8A-8C. In FIG. 13, the image labelled RGB1 corresponds to the primary image; the image labelled RGB2 corresponds to an additional image.

As described previously the obtained images may comprise stereoscopic images of the subject. For example, the images may comprise stereoscopic live-action video of a performer performing within a scene. The images may be captured with a stereoscopic camera; which is to say, a camera comprising at least two image sensors and one or more lenses for focussing light onto those sensors.

It will be appreciated that whilst the input unit 1301 is described as a unit that is separate from the reprojection unit 1302 and combiner 1303, in some examples, the input unit 1301 may form a component of the reprojection unit 1302 and/or combiner 1303.

As shown in FIG. 13, the system 1300 comprises a re-projection unit 1302. The re-projection unit 1302 is configured to re-project at least some of the one or more additional images so as to correspond to the primary viewpoint. Each additional image is re-projected based on the difference in viewpoint (i.e. camera pose) between that image and the primary image. In FIG. 13, the reprojection unit 1302 is shown as receiving image RGB2 as an input, along with the corresponding camera pose data and the camera pose data for image RGB1. The re-projection unit 1302 is configured to re-project the one or more additional images in any of the previously described methods (see section: 'Reprojection').

The system 1300 further comprises a combiner 1303 configured to combine at least some of the re-projected one or more additional images with the primary image so as to generate a composite image. The re-projected one or more additional images provide image data for at least some of the occluded part or parts of the subject in the primary image. The combiner 1303 is configured to combine the primary image with the one or more re-projected additional images in any of the manners described previously (see section: 'Combination').

In FIG. 13, the combiner 1303 is shown as receiving an input from the re-projection unit 1302 corresponding to a reprojection of the RGB2 image. The combiner 1303 is also shown as receiving an input from the input unit corresponding to the RGB1 image. In FIG. 13, the combiner 1303 generates a composite image from the re-projected RGB2 image and primary image RGB1.

In some examples, the combiner 1303 is configured to generate a composite stereoscopic image by combining the primary image (which may be a stereoscopic image) with the re-projected one or more additional images (which themselves, may also be stereoscopic images). The combiner 1303 may be configured to generate the composite stereoscopic image for display at a VDS positioned within a virtual environment. The virtual environment may correspond to a virtual environment that is displayed at an HMD.

Figure 14:
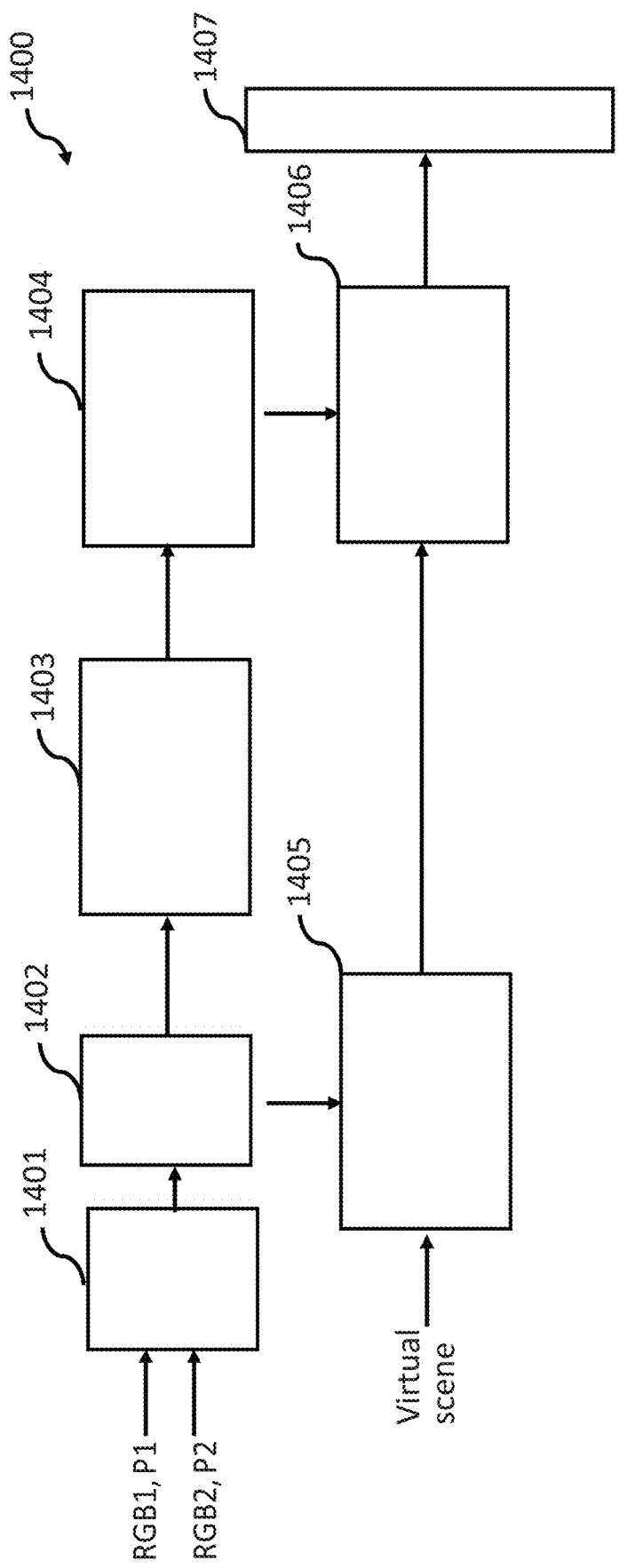
FIG. 14 shows an example of a system for generating an image of a subject in accordance with the present disclosure.

FIG. 14 shows schematically a further example of a system 1400 for generating images of a subject in accordance with the present disclosure. In FIG. 14, the system 1400 is shown as comprising an input unit 1401, depth unit 1402, a re-projection unit 1403, a combiner 1404, VDS generator 1405, projection unit 1406 and display element 1407. The input unit 1401, re-projection unit 1403 and combiner 1404 operate as described above in relation to FIG. 13.

The depth unit 1402 is configured to obtain depth information for the pixels in the composite stereoscopic image. In some examples, the images obtained at the input unit 1401 comprise stereoscopic images of the subject, and so the depth information may be obtained for each input image via stereo-matching. For example, images RGB1 and RGB2 may be provided as inputs to the depth unit 1402, along with the camera pose data. In other examples, depth images may be received as a separate input to the depth unit 1402, with the depth images having been obtained by a depth sensor. For example, the camera that captured the primary and additional images may be associated with a depth sensor, with the field of view of the depth sensor at least partially overlapping (e.g. by 80%) with the field of view of the camera. Depth information may be obtained for each image, such that the pixels in that image are associated with depth data. In this way, the pixels in the re-projected images and composite image are also associated with depth data (which may have been adjusted in accordance with the re-projection).

The VDS generator 1405 is configured to generate a virtual display screen (VDS) for displaying pixels of the composite image. In FIG. 14, the VDS generator 1405 is shown as receiving an input from the depth unit 1402. This is because the VDS generator 1405 is configured to generate a VDS having a shape defined by a three-dimensional mesh that approximates the depth profile of the subject. The depth profile of the subject may be determined in any of the previously described manners. The VDS generator 1405 is also configured to set a VDS position for displaying the composite image in a virtual scene. Hence, in FIG. 14, the VDS generator 1405 is shown as receiving a 'virtual scene' input. It may be, for example, that information relating to the dimensions of a virtual scene is received as an input to the VDS generator 1405, and that this is used to determine where within the scene the VDS is to be positioned. The generation and use of virtual display screens (VDSs) has been described previously in relation to FIGS. 3 to 12.

In some examples, the VDS generator 1405 is configured to generate at least two virtual display screens, each VDS approximating a depth profile of a different portion of the subject. In such examples, at least one of these portions corresponds to a portion of the subject that occludes another portion, when viewed from the primary viewpoint.

In FIG. 14, the system 1400 is further shown as comprising a projection unit 1406. The projection unit 1406 is operable to project pixels in the composite image to a corresponding VDS. In examples where a single VDS is generated for displaying the composite image pixels, this may simply involve projecting the pixels of the composite image onto the mesh. In examples where two or more virtual display screens are generated, the projection unit 1406 may be configured to determine which of the two or more virtual display screens the pixels in the composite image are to be projected onto. This may involve, for example, comparing the depth values associated with the pixels in the composite image with a depth threshold, and then projecting the corresponding pixels (having x- and y-values) to a corresponding mesh, based on the comparison.

In FIG. 14, the projection unit 1406 is shown as receiving an input from the VDS generator 1405 and the composite image. The projection unit 1406 is also shown as providing an output to a display element 1407 for displaying the composite image as projected onto the VDS. The display element 1407 may correspond to the display element of an HMD, for example.

In some examples, the system 1400 may further comprise an image analyser (not shown) and a filtering unit (not shown). The images obtained at the input unit may correspond to images of the subject located in front of a green screen and/or the subject occluded by one or more green objects. The image analyser may be operable to identify at least one of (i) background regions and (ii) occluding objects in the obtained images, based on e.g. pixels in the image corresponding in colour to the colour of the green screen and/or occluding objects.

The filtering unit may be configured to receive an input from the image analyser and based thereon, generate filtered images. The filtered image may comprise pixels identified as corresponding to the subject. For example, the filtered images may correspond to chroma-keyed RGBA images. These images may be provided as an input to the re-projection unit. The filtered primary image may also be provided as an input to the combiner, for combination with the re-projected filtered images Although not shown in FIG. 14, the image analyser and filtering unit may be positioned between the input unit and re-projection unit.

In some examples, the system 1400 may further comprise a pose detector (not shown) operable to a detect a pose of a viewer of the composite image. For example, the composite images may be generated for display at an HMD and the HMD may comprise an accelerometer and or gyroscope for tracking changes in the pose of a viewer's head. Alternatively, or in addition, one or more external cameras may be used for tracking the pose of the viewer's head, e.g. via constellation tracking. The display element 1407 may be operable to display at least some of the pixels obtained from the re-projected one or more additional images (as part of the composite image), in response to the pose of the viewer being detected as a pose at which those parts of the subject are (or would be) visible in the virtual scene.

It will be appreciated that the functionality of the above-described components may be implemented at e.g. a games console, head-mountable display (HMD), personal computer (PC), server or any combination of these. In some embodiments, the composite images and corresponding virtual scenes in which those images are shown are pre-rendered, and so the input unit, re-projection unit and combiner need not necessarily be located at the HMD. For example, the HMD may be operable to receive composite images that have been generated in the above-described manners and display them. In some examples, the VDS generator and/or projection unit are implemented at the HMD. In such examples, it may be that the VDS generator receives information from e.g. a games console, indicating the position and depth of one or more virtual display screens that are to be generated for the immersive content, and based on that information, generates them. In addition, the HMD may comprise a projection unit for projecting composite image pixels onto virtual display screens generated by the VDS generator.

It will be further appreciated that, whilst the above-described embodiments relate primarily to immersive video, the same techniques may be applied to non-VR/AR/XR content. In some examples, the recovered image detail may be used for computing new camera angles for non-VR/AR/XR movies. For example, a scene may be filmed with an array of static cameras, and new and/or a moving camera view may be computed for new (virtual) camera positions, by re-projecting the image to the new viewpoints and including the relevant recovered image detail.

It will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating an image of a subject in a scene, the method comprising:
    obtaining a first image and a second image of a subject in a scene, each image corresponding to a different respective viewpoint of the subject, each image being captured by a different respective camera;
    wherein at least some of the subject is occluded in the first image and not the second image by virtue of the different viewpoints;
    obtaining camera pose data indicating a pose of a camera for each image;
    re-projecting, based on the difference in camera poses associated with each image, at least a portion of the second image to correspond to the viewpoint from which the first image was captured; and
    combining the re-projected portion of the second image with at least some of the first image so as to generate a composite image of the subject from the viewpoint of the first image, the re-projected portion of the second image providing image data for at least some of the occluded part or parts of the subject in the first image, wherein combining the re-projected portion of the second image with at least some of the first image so as to generate a composite image of the subject comprises generating a composite stereoscopic image from the first image and re-projected portion of the second image, wherein the stereoscopic composite image is for display at a virtual display screen (VDS), wherein the method further comprises setting a VDS position for displaying the stereoscopic composite image of the subject in a virtual scene, and wherein the VDS has a shape defined by a three-dimensional mesh, the three-dimensional mesh having a depth profile approximating the depth profile of the subject.

2. A method according to claim 1, wherein the first and second stereoscopic images comprise a live-action video of a performer.

3. A method according to claim 1, comprising:
detecting a first portion of the subject as occluding a second portion of the subject in the first image;
generating virtual displays screens for the first and second portions of the subject, each virtual display screen approximating a depth profile of a respective portion of the subject; and
projecting the pixels of each portion of the subject in the stereoscopic composite image onto a respective corresponding virtual display screen.

4. A method according to claim 3, further comprising:
defining a depth threshold based on the detected occlusion of the second portion by the first portion;
determining a depth associated with the pixels in the composite image; and
projecting the pixels of each portion of the subject onto a corresponding mesh, based on a comparison of the depth associated with those pixels with the depth threshold.

5. A method according to claim 1, wherein re-projecting at least a portion of the second image to correspond to the viewpoint from which the first image was captured comprises:
obtaining depth data associated with the second image;
generating a polygonal mesh of the subject based on the second image and associated depth data the polygonal mesh being generated without a prior step of generating a point cloud of the subject; and
re-projecting at least some portions of the polygonal mesh to be perpendicular to the direction corresponding to the first viewpoint.

6. A method according to claim 5, wherein re-projecting at least a portion of the second image further comprises:
generating a texture for applying to the polygonal mesh, the texture being generated by parallax mapping the second image onto the re-projected mesh; and
rendering a 2D image of the re projected mesh onto which the texture has been applied.

7. A method according to claim 1, wherein each image corresponds to an image of the subject captured in front of a green screen, the method further comprising:
separating, for each image, the pixels corresponding to the subject from pixels corresponding to the background; and
wherein re-projecting at least a portion of the second image comprises re-projecting the pixels corresponding to the subject in the portion of the second image.

8. A method according to claim 1, comprising displaying the composite image at a head-mountable display (HMD).

9. A method according to claim 1 comprising obtaining multiple additional images of the subject, each image being captured from a different respective viewpoint;
obtaining camera pose data indicating a pose of the camera relative to the subject for each image;
re-projecting at least some of the additional images of the subject to correspond to the viewpoint from which the first image was captured, each image being re-projected based on the difference between the camera pose associated with that image and the first image; and
combining the re-projected portions of the additional images with the first image so as to generate an image of the subject from the viewpoint of the first camera.

10. A method according to claim 1, comprising the steps of:
obtaining a user viewpoint; and
if user viewpoint deviates from the viewpoint of the first image,
the re-projecting step comprises respectively re-projecting, based on the difference in camera poses associated with each image, at least a portion of the first and second image to correspond to the user viewpoint; and
the combining step comprises combining the re-projected portion of the second image with at least some of the re-projected first image so as to generate the composite image.

11. A non-transitory, computer readable storage medium having computer executable instructions stored thereon, which when executed by a computer system, causes the computer system to carry out actions, comprising:
obtaining a first image and a second image of a subject in a scene, each image corresponding to a different respective viewpoint of the subject, each image being captured by a different respective camera;
wherein at least some of the subject is occluded in the first image and not the second image by virtue of the different viewpoints;
obtaining camera pose data indicating a pose of a camera for each image;
re-projecting, based on the difference in camera poses associated with each image, at least a portion of the second image to correspond to the viewpoint from which the first image was captured; and
combining the re-projected portion of the second image with at least some of the first image so as to generate a composite image of the subject from the viewpoint of the first image, the re-projected portion of the second image providing image data for at least some of the occluded part or parts of the subject in the first image,
wherein the first and second images comprise stereoscopic images; and
wherein combining the re-projected portion of the second image with at least some of the first image so as to generate a composite image of the subject comprises generating a composite stereoscopic image from the first image and re-projected portion of the second image, wherein the stereoscopic composite image is for display at a virtual display screen (VDS),
wherein the method further comprises setting a VDS position for displaying the stereoscopic composite image of the subject in a virtual scene, and
wherein the VDS has a shape defined by a three-dimensional mesh, the three-dimensional mesh having a depth profile approximating the depth profile of the subject.

12. An image generation system comprising:
an input unit operable to obtain images of a subject in a scene and pose data indicating a pose of the cameras that captured the images;
wherein the images comprise a primary image and one or more additional images, each image corresponding to a different viewpoint of the subject, the primary image corresponding to a viewpoint for which at least some of the subject is occluded;
a re-projection unit configured to re-project, based on the obtained pose data, at least some of the one or more additional images to correspond to the primary viewpoint; and
a combiner configured to combine at least some of the re-projected one or more additional images with the primary image so as to generate a composite image, the re-projected one or more additional images providing image data for at least some of the occluded part or parts of the subject in the primary image,
wherein the input unit is operable to obtain stereoscopic images of the subject
wherein the combiner is configured to generate a composite stereoscopic image by combining the primary image with the re-projected one or more additional images;
wherein the combiner is configured to generate a stereoscopic image for display at a virtual display screen (VDS),
wherein the system further comprises:
  a depth unit operable to obtain a depth information for the pixels in the composite stereoscopic image;
  a VDS generator configured to generate a VDS for displaying the composite stereoscopic image, the VDS generator being configured to set a VDS position for displaying the stereoscopic composite image in a virtual scene; and
wherein the VDS generator is further configured to generate a VDS having a shape defined by a three-dimensional mesh, the three-dimensional mesh having a depth profile that approximates the depth profile of the subject.

13. An image generation system according to claim 12, wherein the VDS generator is configured to generate at least two virtual display screens, each VDS approximating a depth profile of a different portion of the subject, the system further comprising:
a projection unit operable to project pixels in the composite image to a corresponding VDS based on the depth information associated with the pixels in the composite image.

14. An image generation system according to claim 12, wherein the obtained images correspond to images of the subject located in front of a green screen and/or the subject occluded by one or more green objects, the system further comprising:
an image analyser operable to identify at least one of (i) background regions and (ii) occluding objects in the obtained images; and
a filtering unit operable to receive an input from the image analyser and based thereon generate filtered images, the filtered images comprising pixels identified as corresponding to the subject, the filtered images being provided as an input to at least one of the re-projection unit and the combiner.

15. A system according to claim 12, comprising a head-mountable display (HMD) operable to display a virtual scene comprising the composite image.

16. A system according to claim 12, comprising:
a pose detector operable to detect a pose of a viewer of the composite image; and
a display element operable to display at least some of the pixels obtained from the re-projected one or more additional images, in response to the pose of the viewer being detected as a pose at which those parts of the subject are visible in the virtual scene.

17. A system according to claim 12, comprising
a pose detector operable to detect a pose of a viewer; and wherein
the re-projection unit is configured to respectively re-project, based on the obtained viewer pose data, the first image and at least some of the one or more additional images to correspond to a viewpoint of the viewer; and
the combiner is configured to combine at least some of the re-projected one or more additional images with the re-projected primary image so as to generate a composite image, the re-projected one or more additional images providing image data for at least some of the occluded part or parts of the subject in the primary image.

* * * * *